United States Patent
Gangopadhyay

(10) Patent No.: US 7,031,824 B2
(45) Date of Patent: Apr. 18, 2006

(54) MULTIVARIABLE ACTUATOR CONTROL FOR AN INTERNAL COMBUSTION ENGINE

(75) Inventor: Anupam Gangopadhyay, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/819,446

(22) Filed: Apr. 7, 2004

(65) Prior Publication Data

US 2005/0228573 A1   Oct. 13, 2005

(51) Int. Cl.
*F02D 43/00* (2006.01)

(52) U.S. Cl. ............ 701/108; 701/109; 60/605.2; 60/611; 123/684

(58) Field of Classification Search ........ 701/101–110; 123/684; 60/605.2, 611
See application file for complete search history.

(56) References Cited

U.S. PATENT DOCUMENTS

| | | | |
|---|---|---|---|
| 6,076,353 A | 6/2000 | Freudenberg et al. | |
| 6,253,546 B1 * | 7/2001 | Sun et al. | 60/285 |
| 6,305,167 B1 | 10/2001 | Weisman, II et al. | |
| 6,408,834 B1 * | 6/2002 | Brackney et al. | 60/605.2 |
| 6,480,782 B1 | 11/2002 | Brackney et al. | |

FOREIGN PATENT DOCUMENTS

| | | |
|---|---|---|
| JP | 11-030155 | 2/1999 |
| JP | 2001-280201 | 10/2001 |

OTHER PUBLICATIONS

Balas,G., Doyle, J., Glover, K, Packard, A., Smith, R.; mu-Analysis and Synthesis Toolbox User's Guide; Version 3.0.7; Chapter 5, pp. 1-13 and chapter 7, pp 75-131; (cont'd). http://www.mathworks.com/access/helpdesk/help/pdf_doc/mutools/mu.pdf.

* cited by examiner

*Primary Examiner*—Andrew M. Dolinar
(74) *Attorney, Agent, or Firm*—Kathryn A. Marra

(57) ABSTRACT

A system and method for controlling a plurality of control-coupled charge-handling actuators for an internal combustion engine has a multivariable controller responsive to a plurality of engine parameter inputs and effective to provide a plurality of position control signals to the charge handling actuators. Coupling effects of the charge-handling actuator are effectively addressed by the present multivariable control leading to substantial improvements in engine emissions particularly during transient operating conditions.

18 Claims, 4 Drawing Sheets

MULTIVARIABLE ACTUATOR CONTROL FOR AN INTERNAL COMBUSTION ENGINE

TECHNICAL FIELD

The present invention is related to diesel engine controls. More particularly, the present invention is concerned with the interaction and control of a variety of flow control actuators including variable geometry turbochargers, variable nozzle turbochargers, exhaust gas recirculation valves, variable valvetrains and intake throttle valves.

BACKGROUND OF THE INVENTION

Diesel engines having the aforementioned flow control actuators including variable geometry turbochargers (VGT) and variable nozzle turbochargers (VNT) (hereinafter collectively referred to as VGT/VNT), exhaust gas recirculation valves (EGR) and intake throttle valves (ITV) are well known. With respect to VGT/VNT and EGR, since both interact with exhaust gas flow there is characteristically significant and substantial interaction and cross-effects (control-coupling) therebetween. It is generally understood that such interaction requires control accounting if they are to be used simultaneously. Conventionally, however, calibration addresses such interaction by the use of ad-hoc set-point and control logic characterized by open-loop boost control operation when the EGR valve is open. Generally, then, the EGR valve is closed when torque is demanded by the driver (e.g. high speed/load operation) and opened once torque demand goes down (e.g. low speed/load operation).

Similarly EGR and ITV both effect control upon the engine mass airflow (MAF) in to the intake manifold. Sensed MAF is often used to control both EGR and ITV positioning; however, since both EGR and ITV interact with MAF there is characteristically significant and substantial interaction and cross-effects therebetween. Conventionally, and similar to the aforementioned EGR and VGT/VNT cross-effects, the EGR and ITV interaction is addressed through independent control of the individual actuators wherein one is used to the substantial exclusion of the other.

While such turbocharged diesel engine control and calibration for EGR and VGT/VNT may provide, on balance, satisfactory results (e.g. low NOx and soot emissions) in substantially steady-state or quiescent operation, certain transient operation may result in undesirable levels of emissions, with respect to both temporal and drive-cycle averaged results. This is due to the transient interaction between the aforementioned charge-handling system components (EGR, VNT/VGT and ITV) and to the generally conservative EGR and turbo-boost calibration scheduling.

Therefore, there is a continuing need in the art for controlling emissions in internal combustion engines. A need exists to improve internal combustion engine controls which may be compromised by cross-effects between charge-handling components. These cross-effects can be substantial and unless addressed will lead to degraded responses, instability and unacceptable performance and emissions. Additional improvements to emissions are particularly desirable during transient operating conditions.

SUMMARY OF THE INVENTION

A diesel engine system includes a plurality of control-coupled actuators wherein changes to one affects the control and response of the others. The present invention provides a system and method for control of an internal combustion engine. Particularly, a method for controlling control-coupled actuators in an internal combustion engine system includes providing desired engine operating setpoints for a variety of engine operating parameters, determining deviations of the engine operating parameters relative to the setpoints, providing the deviations to a multivariable controller, and providing position control signals to the control-coupled actuators from the multivariable controller. In accordance with a preferred embodiment, the multivariable controller considers existing loop interactions.

In accordance with one embodiment directed toward charge-handling actuators, the system and method of the invention is applied to various charge-handling actuators such as exhaust gas recirculation valves, variable geometry turbochargers, variable nozzle turbochargers, variable valvetrains, and intake throttle valves.

Further improvements can be realized by inclusion of feedforward position control for the various control-coupled actuators whose position is established by the multivariable control of the present invention.

These and other features and advantages of the invention will be more fully understood from the following description of certain preferred embodiments of the invention taken together with the accompanying drawings.

BRIEF DESCRIPTION OF THE DRAWINGS

Referring now to the drawings, which are meant to be exemplary and not limiting, and wherein like elements are numbered alike in the several Figures.

DESCRIPTION OF THE PREFERRED EMBODIMENT

Figure 1:
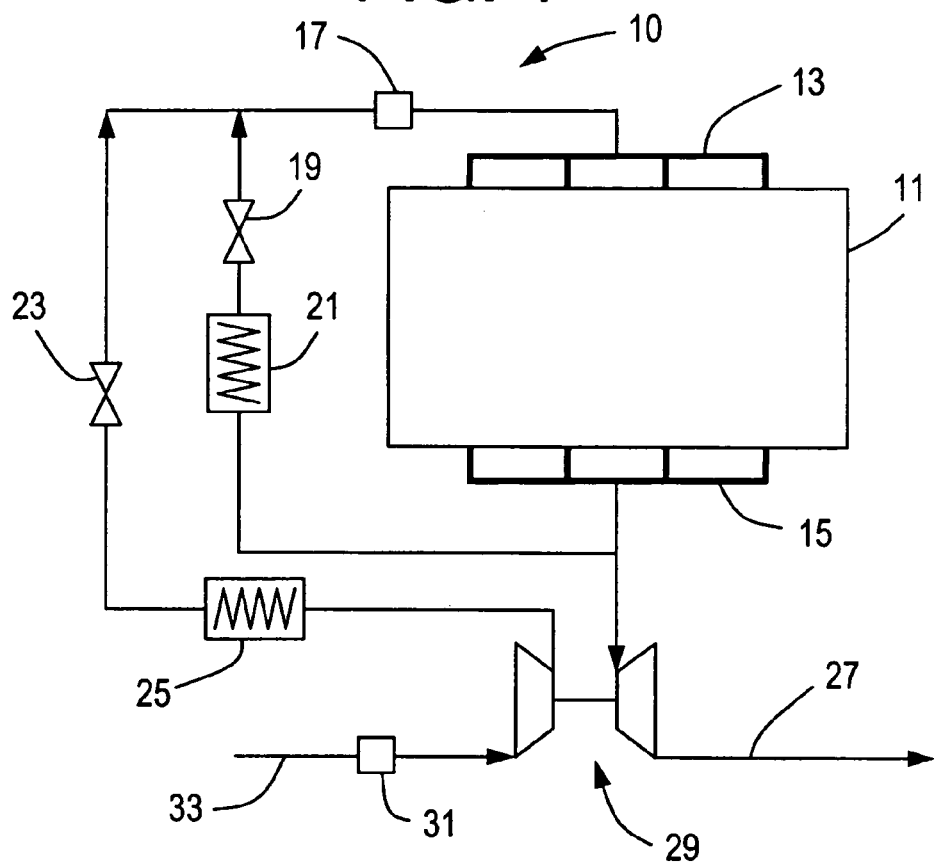
FIG. 1 is a schematic representation of an exemplary turbocharged diesel engine system for illustrating a preferred embodiment of the present invention.

A preferred embodiment will now be described in conjunction with application of the present invention to a turbocharged diesel engine system, generally labeled 10 in FIG. 1. The diesel engine system includes engine 11 having intake manifold 13 and exhaust manifold 15, each of which includes a plurality of runners (not separately labeled) corresponding in number to the number of individual cylinders of the engine 11. Intake air at substantially atmospheric pressure is ingested at intake 33. Conventional mass airflow sensor (MAF) 31 is coupled to the flow of ingested air upstream from turbocharger 29 for providing a signal indicative of the mass flow rate of inducted air. Turbocharger 29 is adapted to provide a variable boost pressure for a given exhaust flow in accordance with well known variable vane geometry or variable nozzle geometry, commonly referred to as variable geometry turbocharger (VGT) and variable nozzle turbocharger (VNT), respectively. Further reference to turbocharger may be VNT 29 consistent with a particular embodiment of the invention utilizing a variable nozzle turbocharger. The airflow is compressed by turbocharger 29 and provided to intercooler 25. Further downstream is conventional electrically controllable intake throttle valve (ITV) 23 which may take the form of a stepper motor controlled butterfly valve or other actuator/valve combination adequate for varying the intake restriction. Continuing downstream is conventional manifold absolute pressure (MAP) sensor 17 for providing a pressure signal therefrom. Exhaust gases are expelled from individual cylinders to a corresponding plurality of runners (not separately labeled) and into exhaust manifold 15. Exhaust gases are channeled from the exhaust manifold to drive the turbine of turbocharger 29 and thereafter finally exhausted through exhaust line 27 to atmosphere subsequent to passing through exhaust gas after treatment devices (not separately illustrated) such as NOx traps, catalytic treatment devices, particulate filters and various combinations thereof. Also after the exhaust manifold but preceding the turbocharger, a portion of exhaust gas flow is directed through an exhaust gas recirculation path to conventional exhaust gas cooler 21 and electrically controllable exhaust gas recirculation (EGR) valve 19, typically but not necessarily, a solenoid-actuated pintle valve. The flow through the exhaust gas recirculation path continues downstream of EGR valve 19 to be mixed with the fresh intake air flow to establish the ingested cylinder charge gas mix. Not illustrated in the various figures but integral to the implementation of the present invention and the engine system is a conventional microprocessor based engine or powertrain control module comprising such common elements as microprocessor, read only memory ROM, random access memory RAM, electrically programmable read only memory EPROM, high speed clock, analog to digital (A/D) and digital to analog (D/A) circuitry, input/output circuitry and devices (I/O), and appropriate signal conditioning and buffer circuitry. The various functions and interfaces, both internal and external the control module are shown in the various figures in distributed format as will be apparent to one skilled in the art from the following description.

Figure 2:
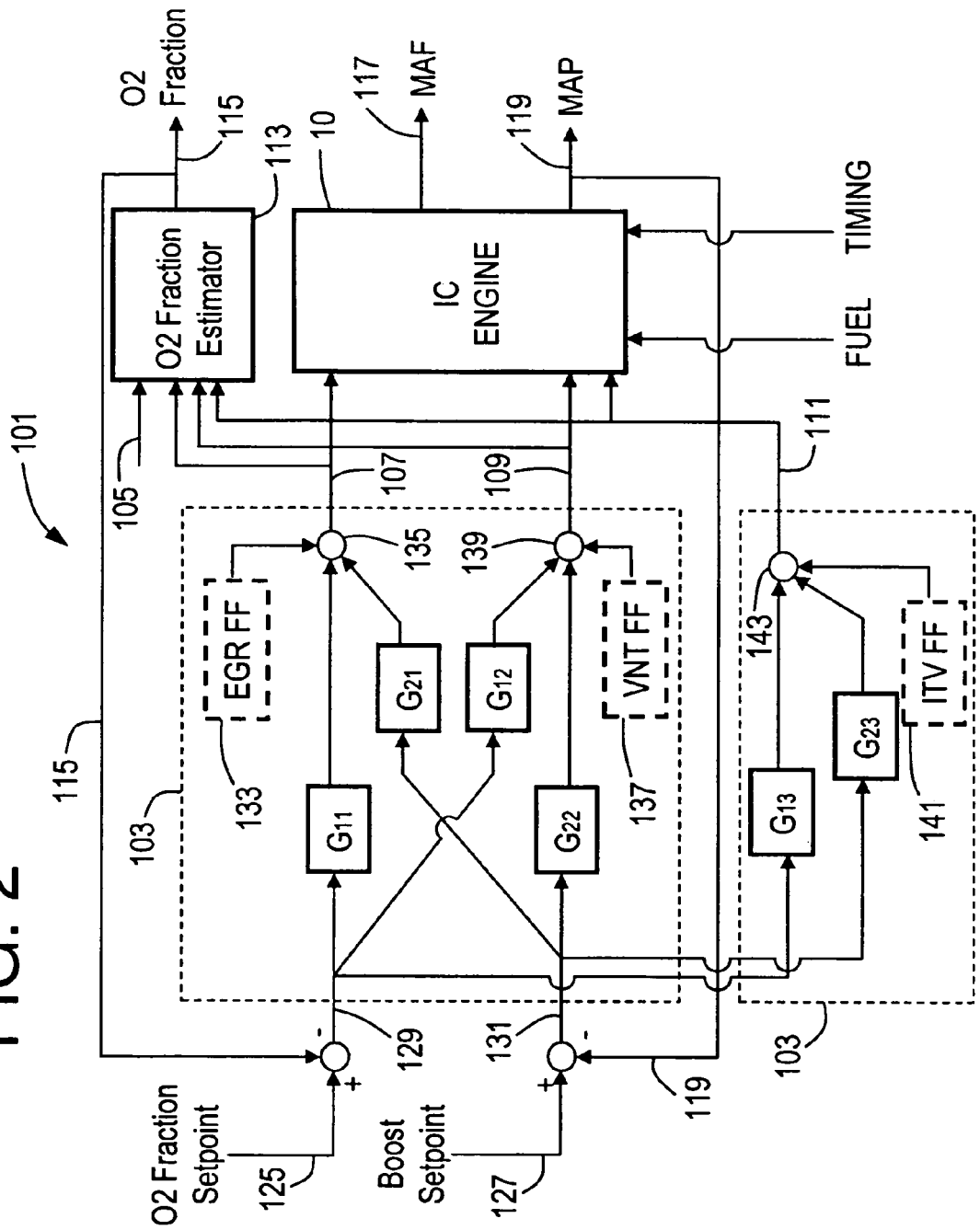
FIG. 2 is an engine control block diagram including a preferred multivariable controller for illustrating a preferred embodiment of the present invention.

With reference now to FIG. 2, engine control block diagram 101 is illustrated including the engine system 10 of FIG. 1 repeated in simplified block form with the addition of control and signal lines as described herein below. The system and associated methods of the present invention in the presently described preferred embodiment rely upon control setpoints for engine intake operating parameters in the fraction of oxygen (O2 fraction setpoint), the ingested cylinder charge gas mix and the turbocharger boost pressure (boost setpoint). These two operating parameter setpoints are provided on lines 125 and 127, respectively. Furthermore, these signals are internal to the controller and derived therein in a generally well known manner as described herein below in brief but sufficient detail.

O2 fraction setpoint and boost setpoint, including other setpoints for similar engine operating parameters of general control interest, are preferably stored in data structures in non-volatile memory (e.g. tables) and retrievable with respect to references by engine speed and load variables as part of a torque based engine control strategy responsive to a torque request signal resolved, for example, from throttle pedal position. Such operating setpoint table data are preferably empirically derived from standard engine dynamometer testing of the subject engine over a variety of speed and load points of interest for emissions and across varied VNT (or VGT) vane positions, EGR valve positions and ITV positions and fuel injection timing. Setpoint correction factors may commonly be associated also with the setpoints so derived to account for the influences of such variables as engine coolant temperature and ambient conditions.

O2 fraction setpoint and boost setpoint each is combined at a respective summing node with a respective feedback signal. The resultant O2 fraction error signal on line 129 is provided as a first input to multivariable controller 103. Similarly, the resultant boost error signal on line 131 is provided as a second input to multivariable controller 103. The feedback signals are provided variously from an O2 fraction estimator 113 on line 115 and from conditioned and filtered manifold absolute pressure on line 119 derived from the raw signal from MAP sensor 17. The O2 fraction estimator relies on the position control signals from the multivariable controller 103 for the charge-handling actuators—EGR valve, VNT and ITV—on lines 107, 109 and 111, respectively. O2 fraction estimator also includes various other powertrain parameter inputs such as MAF and MAP, engine coolant temperature, and wide range exhaust oxygen content illustrated in the aggregate on line 105. The intake O2 fraction estimate is preferably calculated based on the EGR flow rate estimate and oxygen content of EGR flow based on an exhaust wide range oxygen sensor, inlet fresh air flow (such as from a MAF sensor) and estimated engine charge flow at the engine operating point. The dynamic model that estimates the intake O2 fraction considers the intake manifold filling and emptying effect through an ordinary differential equation. Alternatively, a conventional wide range oxygen sensor may provide the necessary O2 fraction feedback signal on line 115 after conventional conditioning and filtering.

With specific reference now to the multivariable controller 103 in FIG. 2, O2 fraction error signal on line 129 and boost error signal on line 131 are inputs into three sets of 2×2 subsystems (i.e. two-input×two-output). Those skilled in the art will recognize that these subsystems are in P-canonical form wherein the loop interactions are regarded as feed forward couplings. Each of the transfer functions or controllers, Gxy, is generated in accordance with well known synthesis techniques. For example, each of the controllers may be synthesized as an individual PID controller as follows:

$$G_{xy} = K_P * u + K_I \int u\,dt + K_D \frac{du}{dt}$$

where u is the input signal operated on by the controller. The scalar gains for these individual controllers—$K_P$, $K_I$ and $K_D$—are tuned at specific speed/load based operating points. Preferably, the tuning is accomplished on vehicle or, alternatively, may be accomplished through engine simulation techniques. The controllers, Gxy, therefore collectively essentially comprise a multivariable extension of classic single parameter PID controllers. It is envisioned that to adequately cover the entire speed/load range of engine operation multiple sets of controllers may be employed and scheduled as a function of speed and load points. It will be recognized by one skilled in the art that the individual controllers as described may be replaced with a single matrix controller and corresponding matrix gain terms in $[K_P]$, $[K_I]$ and $[K_D]$.

Figure 6:
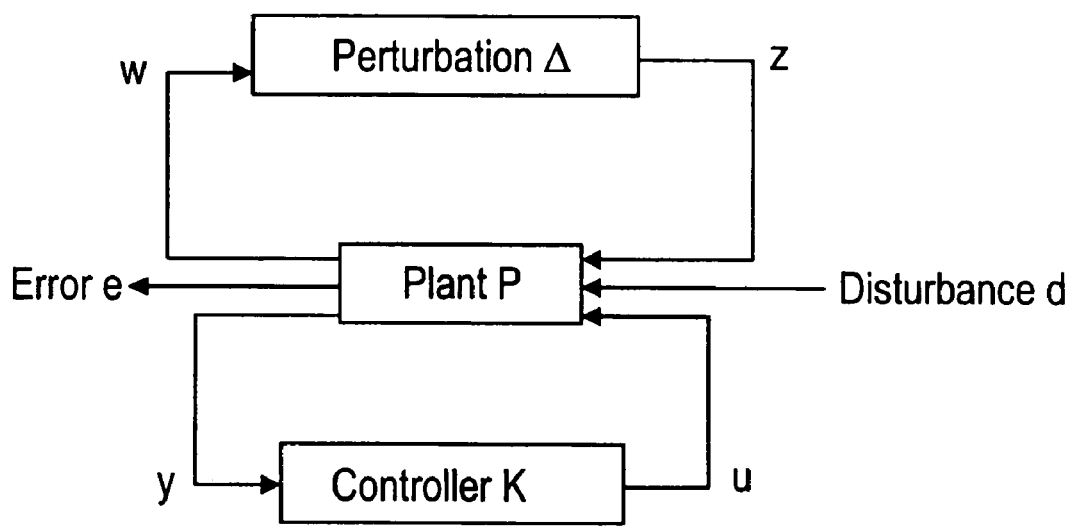

Alternatively, the controllers, Gxy, may be synthesized completely off vehicle in a virtual space. One such exemplary technique is illustrated in the model shown in FIG. 6. The resultant controllers, Gxy, are more complicated than the PID blocks discussed above. This procedure will incorporate variations from nominal in the engine plant at an operating point being considered and finds a nominally stabilizing controller K such that the closed-loop system is stable for all perturbations Δ. With this technique, the controller is synthesized by minimizing a structured singular value or cost function ☐(.) of the closed loop transfer function $F_L(P,K)$ as follows:

$$\min_{K} \max_{\omega} \mu_\Delta(F_L(P, K)(j\omega)) \quad (2)$$

where the maximization over all perturbations is done with the constraint that the perturbations satisfy the following relationship:

$$\max_{\omega} \overline{\sigma}[\Delta(j\omega)] \leq 1 \quad (3)$$

In the above relationships, '☐' is the frequency where the structured singular value, ☐(.), is computed and $F_L(P,K)$ is the linear fractional transformation as follows:

$$F_L(P,K) = P_{11} + P_{12}K(I - P_{22}K)^{-1}P_{21} \quad (4)$$

where P is the plant $$P = \begin{bmatrix} P_{11} & P_{12} \\ P_{21} & P_{22} \end{bmatrix} \quad (5)$$

The structured singular value is defined by the following relationship:

$$\mu_\Delta(M) = \frac{1}{\min\{\overline{\sigma}(\Delta): \det(I - M\Delta) = 0\}} \quad (6)$$

where ☐ is the maximum singular value, and
I denotes an identity matrix.

The optimization procedure is carried out with the help of commercially available engineering simulation software, such as MATLAB® and its associated application toolboxes, e.g. Mu-Analysis and Synthesis Toolbox.

For each of the three sets of 2×2 subsystems, the outputs are summed at respective nodes labeled variously as 135, 139 and 143. The outputs from the nodes comprise the position control signals for the EGR, VNT and ITV on lines 107, 109 and 111, respectively as previously alluded to. These position control signals then are acted on as targets in respective conventional position control loops for the charge-handling actuators.

Additional control advantage is obtained in a preferred embodiment by employing feed forward position control signals for each of the various charge-handling actuators. Therefore, EGR feedforward block 133 is illustrated with feed forward output signal also summed at node 135 in establishing the resultant position control signal for EGR on line 107. Similarly, VNT feed forward block 137 is illustrated with its feed forward output signal summed at node 139 in establishing the resultant position control signal for VNT on line 109. And ITV feed forward block 141 is illustrated with its feed forward output signal summed at node 143 in establishing the resultant position control signal for ITV on line 111. These feed forward signals may be a function of engine operating parameters such as speed and fuel commands, or based on models of the flow devices (EGR or ITV) as further described herein below with particular reference to FIGS. 3–5.

Figure 3:
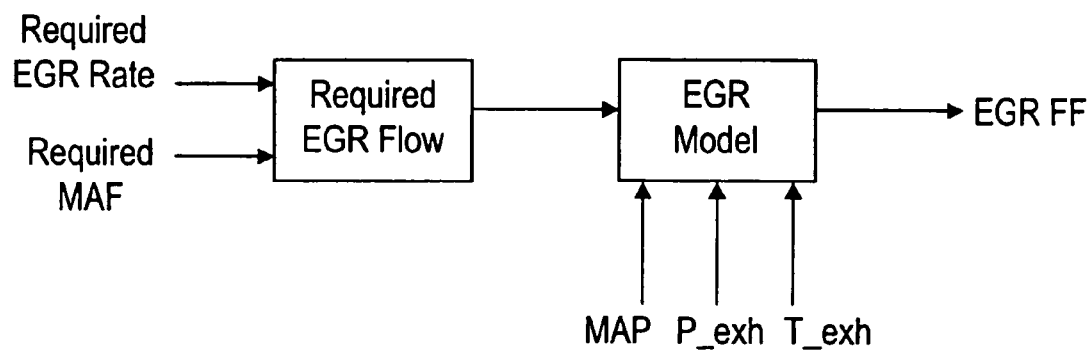
FIG. 3 is a block diagram of an exemplary model-based feedforward control for EGR position as shown in the control block diagram of FIG. 2.
Figure 4:
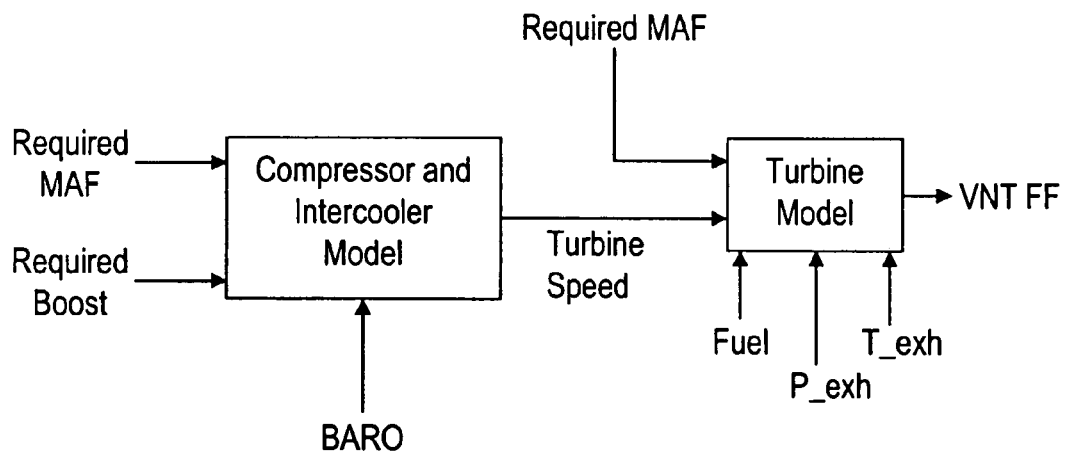
FIG. 4 is a block diagram of an exemplary model-based feed-forward control for VNT position as shown in the control block diagram of FIG. 2.
Figure 5:
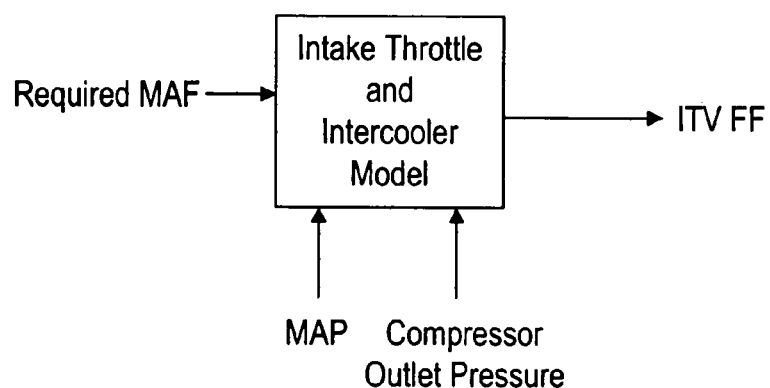
FIG. 5 is a block diagram of an exemplary model-based feed-forward control for ITV position as shown in the control block diagram of FIG. 2; and, FIG. 6 is a block diagram of simulation-based synthesis procedure for establishing the transfer functions of the multivariable controller illustrated in FIG. 2.

Turning now to FIGS. 3–5 wherein block diagrams of exemplary EGR, VNT and ITV feed forward controls, respectively, are illustrated, it is noted that each such control preferably relies on a model-based feed forward calculation based on an inverse relationship of the physical model of the corresponding one of the EGR, VNT or ITV position control process. Development of such models are generally well known and may include flow bench testing of the respective components in accordance with ideal gas and compressible flow relationships and flow geometries for the components. Beginning with the EGR feed forward control of FIG. 3, required EGR flow is resolved from a required EGR rate and required mass airflow (MAF) wherein EGR rate is a desired or target EGR rate and required mass airflow is obtained from the MAF sensor. The EGR model then relies on the required EGR flow signal, MAP signal, exhaust pressure (P_exh) (measured or estimated), and exhaust temperature (T_exh) (measured or estimated). The output from the EGR model provides the EGR feedforward signal for use in position control of EGR valve 19. In FIG. 4, a complex model including compressor and intercooler model and turbine model is illustrated for the VNT feed forward control portion of FIG. 2. Therein, the compressor and intercooler model requires an input in ambient barometric pressure (BARO) obtained, for example, from a conventional barometric pressure sensor not separately illustrated in the figures. Additionally, inputs in mass airflow (MAF) and required boost are also required, the mass airflow being obtained from the MAF sensor and the required boost being obtained from a set-point table as previously described. The compressor and intercooler model output is turbine speed which is an input then to the turbine model. Other turbine model inputs include mass air flow (MAF), fuel mass, exhaust pressure (P_exh) (measured or estimated), and exhaust temperature (T_exh) (measured or estimated). The output from the turbine model provides the VNT feedforward signal for use in position control of VNT 29. In FIG. 5, an ITV and intercooler model requires an input in required mass airflow (MAF) obtained from an operating point table, manifold absolute pressure (MAP) obtained from MAP sensor, and VNT compressor outlet pressure, an estimated quantity. The output from the ITV and intercooler model provides the ITV feedforward signal for use in position control of ITV 23.

The resultant coordination of the three exemplary charge-handling actuators simplifies transient calibration as the interactions are handled in the mathematical design of the multivariable controller. The multivariable controller will also be able to deliver the desired improved transient results for the simultaneous control of NOx and smoke in a diesel engine through precision EGR metering based on torque demand and current engine speed. Advantageously, because of tighter transient control enabled by the present invention, more aggressive schedules can also be used for boost pressure and EGR. The co-ordination of the EGR valve with the ITV will also make airflow control lean-rich transition easier to handle and with less resultant torque fluctuation while regenerating after-treatment devices using in-cylinder control.

The present invention has been described with respect to a preferred implementation to certain charge-handling actuators in a diesel engine system. But the invention may be readily applied to other control-coupled actuators in all forms of internal combustion engine systems including compression ignition and spark-ignition engines. The particular charge-handling actuators utilized herein to exemplify the invention are merely examples of such actuators. For example, exhaust gas recirculation may be accomplished in accordance with well known internal recirculation techniques utilizing variable valve actuation technologies such as electrically actuated valves, cam phasers and multi-lobed cams, etc. Therefore, while the invention has been described by reference to certain preferred embodiments, it should be understood that numerous changes could be made within the spirit and scope of the inventive concepts described herein. Accordingly, it is intended that the invention not be limited to the disclosed embodiments, but that it have the full scope permitted by the language of the following claims.

The invention claimed is:

1. Method for controlling a plurality of control-coupled charge-handling actuators in an internal combustion engine, comprising:
   providing desired engine operating setpoints for engine intake oxygen fraction and engine intake pressure;
   determining deviations of engine intake oxygen fraction and engine intake pressure relative to said operating setpoints for engine intake oxygen fraction and engine intake pressure;
   providing said deviations to a multivariable controller; and,
   providing position control signals to said plurality of control-coupled charge-handling actuators from said multivariable controller.

2. The method as claimed in claim 1 wherein said charge-handling actuators comprise two or more actuators selected from the group consisting of an exhaust gas recirculation apparatus, a variable gate turbocharger, a variable nozzle turbocharger, variable valvetrain apparatus and an intake air throttle apparatus.

3. The method as claimed in claim 1 wherein said multivariable controller comprises feed-forward coupling of said deviations.

4. The method as claimed in claim 1 further comprising:
   providing feed-forward signals for summation with said position control signals.

5. The method as claimed in claim 1 wherein determining deviations of engine intake oxygen fraction and engine intake pressure relative to said operating setpoints for engine intake oxygen fraction and engine intake pressure comprises:
   estimating intake oxygen fraction from said position control signals and comparing the estimated intake oxygen fraction to the corresponding engine operating setpoint.

6. The method as claimed in claim 1 wherein determining deviations of engine intake oxygen fraction and engine intake pressure relative to said operating setpoints for engine intake oxygen fraction and engine intake pressure comprises:
   providing an intake oxygen fraction signal from a wide-range oxygen sensor and comparing said intake oxygen fraction signal to the intake oxygen fraction engine operating setpoint; and,
   providing an engine intake pressure signal from a pressure sensor and comparing said engine intake pressure signal to the intake pressure engine operating setpoint.

7. The method as claimed in claim 1 wherein said multivariable controller comprises feed forward couplings.

8. System for controlling a plurality of control-coupled charge-handling actuators in an internal combustion engine, comprising:
   means for providing desired engine operating setpoints for engine intake oxygen fraction and engine intake pressure;
   means for determining deviations of the engine intake oxygen fraction and engine intake pressure relative to said operating setpoints for engine intake oxygen fraction and engine intake pressure;
   a multivariable controller having a plurality of inputs and outputs, said plurality of inputs including said deviations of engine intake oxygen fraction and engine intake pressure, said plurality of outputs including position control signals to said plurality of control-coupled charge-handling actuators.

9. The system as claimed in claim 8 wherein said charge-handling actuators comprise two or more actuators selected from the group consisting of an exhaust gas recirculation apparatus, a variable gate turbocharger, a variable nozzle turbocharger, variable valvetrain apparatus and an intake air throttle apparatus.

10. The system as claimed in claim 8 wherein said multivariable controller comprises feed-forward coupling of said deviations.

11. The system as claimed in claim 8 further comprising:
    means for providing feed-forward signals for summation with said position control signals.

12. The system as claimed in claim 8 wherein said means for determining deviations of the engine intake oxygen fraction and engine intake pressure relative to said operating setpoints for engine intake oxygen fraction and engine intake pressure comprises:
    means for estimating intake oxygen fraction from said position control signals and comparing the estimated intake oxygen fraction to the corresponding engine operating setpoint.

13. The system as claimed in claim 8 wherein said means for determining deviations of the engine intake oxygen fraction and engine intake pressure relative to said operating setpoints for engine intake oxygen fraction and engine intake pressure comprises:
    a wide-range oxygen sensor effective to provide an intake oxygen fraction signal;
    a pressure sensor effective to provide an engine intake pressure signal;
    means for comparing said intake oxygen fraction signal to the intake oxygen fraction engine operating setpoint; and,
    means for comparing said engine intake pressure signal to the intake pressure engine operating setpoint.

14. The system as claimed in claim 8 wherein said multivariable controller comprises feed forward couplings.

15. The method as claimed in claim 1 wherein determining deviations of engine intake oxygen fraction and engine intake pressure relative to said operating setpoints for engine intake oxygen fraction and engine intake pressure comprises:

providing an intake oxygen fraction signal from a wide-range oxygen sensor and comparing said intake oxygen fraction signal to the intake oxygen fraction engine operating setpoint.

16. The method as claimed in claim 1 wherein determining deviations of engine intake oxygen fraction and engine intake pressure relative to said operating setpoints for engine intake oxygen fraction and engine intake pressure comprises:

estimating intake oxygen fraction from said position control signals and comparing the estimated intake oxygen fraction to the intake oxygen fraction engine operating setpoint; and, providing an engine intake pressure signal from a pressure sensor and comparing said engine intake pressure signal to the intake pressure engine operating setpoint.

17. The system as claimed in claim 8 wherein said means for determining deviations of the engine intake oxygen fraction and engine intake pressure relative to said operating setpoints for engine intake oxygen fraction and engine intake pressure comprises:

a wide-range oxygen sensor effective to provide an intake oxygen fraction signal; and means for comparing said intake oxygen fraction signal to the intake oxygen fraction engine operating setpoint.

18. The system as claimed in claim 8 wherein said means for determining deviations of the engine intake oxygen fraction and engine intake pressure relative to said operating setpoints for engine intake oxygen fraction and engine intake pressure comprises:

means for estimating intake oxygen fraction from said position control signals and comparing the estimated intake oxygen fraction to the intake oxygen fraction engine operating setpoint;

a pressure sensor effective to provide an engine intake pressure signal; and, means for comparing said engine intake pressure signal to the intake pressure engine operating setpoint.

* * * * *